(12) United States Patent
Polley et al.

(10) Patent No.: US 7,275,494 B2
(45) Date of Patent: Oct. 2, 2007

(54) VALVE STRUCTURE, BLADDER, AND HULL PORTION FOR INFLATABLE BOATS

(75) Inventors: Dale Polley, Buda, TX (US); David Hotz, New Braunfels, TX (US); Russell Taylor, Buda, TX (US)

(73) Assignee: Cryogenic Plastics, Inc., Austn, TX (US)

( * ) Notice: Subject to any disclaimer, the term of this patent is extended or adjusted under 35 U.S.C. 154(b) by 0 days.

(21) Appl. No.: 11/608,749

(22) Filed: Dec. 8, 2006

(65) Prior Publication Data

US 2007/0079745 A1    Apr. 12, 2007

Related U.S. Application Data

(63) Continuation of application No. 11/092,290, filed on Mar. 29, 2005, now Pat. No. 7,146,923.

(60) Provisional application No. 60/557,567, filed on Mar. 30, 2004.

(51) Int. Cl.
B63B 7/00 (2006.01)

(52) U.S. Cl. .......................... 114/345; 137/223; 441/41

(58) Field of Classification Search ................ 114/345, 114/347, 357; 441/35, 41; 137/223, 224, 137/232

See application file for complete search history.

(56) References Cited

U.S. PATENT DOCUMENTS

| 2,430,076 | A | 11/1947 | Pollock |
|---|---|---|---|
| 2,525,085 | A | 10/1950 | Vickers |
| 2,573,609 | A | 10/1951 | Robinson |
| 2,611,722 | A | 9/1952 | George |
| 2,773,541 | A | 12/1956 | Mulbarger et al. |
| 2,945,532 | A | 9/1960 | Filippo |
| 3,650,874 | A | 3/1972 | Job et al. |
| 3,780,768 | A | 12/1973 | Soderstrom |
| 3,899,819 | A | 8/1975 | Ostbo |
| 4,015,623 | A | 4/1977 | Wanstreet |
| 4,478,587 | A | 10/1984 | Mackal |
| 4,766,628 | A | 8/1988 | Walker |
| 4,931,612 | A | 6/1990 | Belleride et al. |
| 5,322,724 | A | 6/1994 | Levens |
| 5,732,650 | A | 3/1998 | Peterson |
| 5,870,965 | A | 2/1999 | Hansen |

(Continued)

*Primary Examiner*—Lars A. Olson
(74) *Attorney, Agent, or Firm*—Russell D. Culbertson; The Culbertson Group, P.C.

(57) ABSTRACT

A valve structure includes a valve body on which is mounted a first valve and a second valve. The first valve traverses the valve body at a first position and the second valve traverses the valve body at a second position spaced apart from the first position. The first valve may comprise a fill valve and the second valve may comprise a pressure relief valve. Alternatively, a single valve structure may incorporate both the fill and pressure relief functions. The valve structure may be incorporated with a bladder made of a flexible and elastic material. In this arrangement, the valve body is positioned in a valve receiving opening in the bladder material and is sealed to the bladder material around the periphery of the valve receiving opening so as to define a sealed bladder interior with the bladder material. Such a valve and bladder combination may be used together with a hull tube to form a portion of an inflatable hull for a boat.

18 Claims, 6 Drawing Sheets

U.S. PATENT DOCUMENTS

| | | |
|---|---|---|
| 5,878,685 A | 3/1999 | Hemphill et al. |
| 6,089,251 A | 7/2000 | Pestel |
| 6,371,040 B1 | 4/2002 | Hemphill et al. |
| 6,460,477 B1 | 10/2002 | Hamlton et al. |
| 7,013,911 B2 | 3/2006 | Wass et al. |
| 7,025,080 B2 | 4/2006 | Wass et al. |
| 7,146,923 B2 * | 12/2006 | Polley et al. ............... 114/345 |

* cited by examiner

VALVE STRUCTURE, BLADDER, AND HULL PORTION FOR INFLATABLE BOATS

CROSS-REFERENCE TO RELATED APPLICATION

This application is a continuation of U.S. patent application Ser. No. 11/092,290, filed Mar. 29, 2005, and entitled "VALVE STRUCTURE, BLADDER, AND HULL PORTION FOR INFLATABLE BOATS," now U.S. Pat No. 7,146,923. The benefit of this prior application is hereby claimed in the present application pursuant to 35 U.S.C. §120. This application also claims the benefit under 35 U.S.C. §119(e) of U.S. Provisional Patent Application Ser. No. 60/557,567, filed Mar. 30, 2004, and entitled "VALVE STRUCTURE, BLADDER, AND HULL PORTION FOR INFLATABLE BOATS." The entire content of each of these prior applications is incorporated herein by this reference.

TECHNICAL FIELD OF THE INVENTION

The invention relates to a valve structure and valve structure/bladder combination for use in inflatable boats such as rigid inflatable boats and inflatable rafts. The invention also encompasses a hull portion or hull for such inflatable boats and rafts.

BACKGROUND OF THE INVENTION

Small boats and rafts have commonly used inflatable elements for buoyancy and for other purposes. Rafts using inflatable elements may include no rigid structure and rely on the inflatable elements to form a desired hull shape. Other boats include both a rigid hull and an inflatable collar commonly positioned around the top of the front and sides of the rigid hull portion. Boats including both a rigid hull portion and an inflatable collar are commonly referred to as rigid inflatable boats (also commonly abbreviated to "RIB boats").

Prior RIB boats utilize an inflatable collar in which the collar material is required to both contain the gas pressure for inflation, and to provide a tough and durable exterior. A problem with current RIB boat collars is that specialized materials and assembly techniques are required to produce collars that are capable of retaining gas pressure and providing the desired durable exterior surface. Another problem with current RIB boat collars is that a single puncture to the collar material will allow the entire collar to deflate unless air-tight dividers are used within the collar to form separate pressure cells along the length of the collar. Although such dividers do solve the problem of having the entire collar deflate in response to a single puncture, the dividers are difficult to form.

SUMMARY OF THE INVENTION

The present invention provides a valve structure that can be used to form a two-piece inflatable hull portion for an inflatable boat or raft. The invention encompasses the valve structure itself, a bladder formed with the valve structure, and an inflatable hull portion that includes the bladder and an outer hull tube. As used in this disclosure and the accompanying claims, the term "boat" will include both rafts and boats such as RIB boats.

A valve structure embodying principles of the invention includes a valve body on which is mounted a first valve and a second valve. The first valve traverses the valve body at a first position and the second valve traverses the valve body at a second position spaced apart from the first position. In one form of the invention, the first valve is a fill valve and the second valve is a pressure relief valve. In other forms of the invention, a single valve structure may incorporate both the fill and pressure relief functions.

One preferred valve structure includes both a first flange and a second flange extending from the valve body around the periphery of the valve body. The first flange extends generally in a plane transverse to a longitudinal axis of the first valve, and the second flange extends generally parallel to the first flange. The two flanges extend in a spaced apart relationship to define a valve body positioning structure. The valve body and each flange may have a generally oval peripheral shape.

In accordance with one aspect of the invention, the valve structure made up of the valve body and the fill and pressure relief valves is incorporated with a bladder made of a flexible and elastic material. The valve body is positioned in a valve receiving opening in the bladder material and is sealed to the bladder material around the periphery of the valve receiving opening so as to define a sealed bladder interior with the bladder material. The lower or inner flange of the double flange structure may be used to provide an extensive surface for providing a durable seal between the valve structure and bladder material.

A valve and bladder combination according to the present invention may be used together with a hull tube to form a portion of an inflatable hull (an inflatable hull portion) for a boat. The hull tube includes at least a portion made of a readily bendable sheet material, preferably a fiber reinforced plastic material. An access opening is formed at an access location in the flexible hull tube material. The preferred double flange arrangement included in the valve structure may be used to maintain the position of the valve in the access opening.

An inflatable hull portion according to the present invention uses the bladder to receive and retain inflation gas pressure for the hull portion, and uses the hull tube material for providing a tough and durable exterior surface. This allows the hull tube material to be selected without regard to its ability to hold gas pressure. The bladder material may be selected solely for its gas pressure holding properties and for its relatively greater flexibility and elasticity as compared to the hull tube material. Although the flexible bladder must be inserted into the hull tube, the hull tube access opening provides ready access for bladder insertion and also cooperates with the valve structure to retain the valve structure at the desired location to provide easy access to the fill and pressure relief valves or valve.

These and other advantages and features of the invention will be apparent from the following description of the preferred embodiments, considered along with the accompanying drawings.

DESCRIPTION OF PREFERRED EMBODIMENTS

Figure 1:
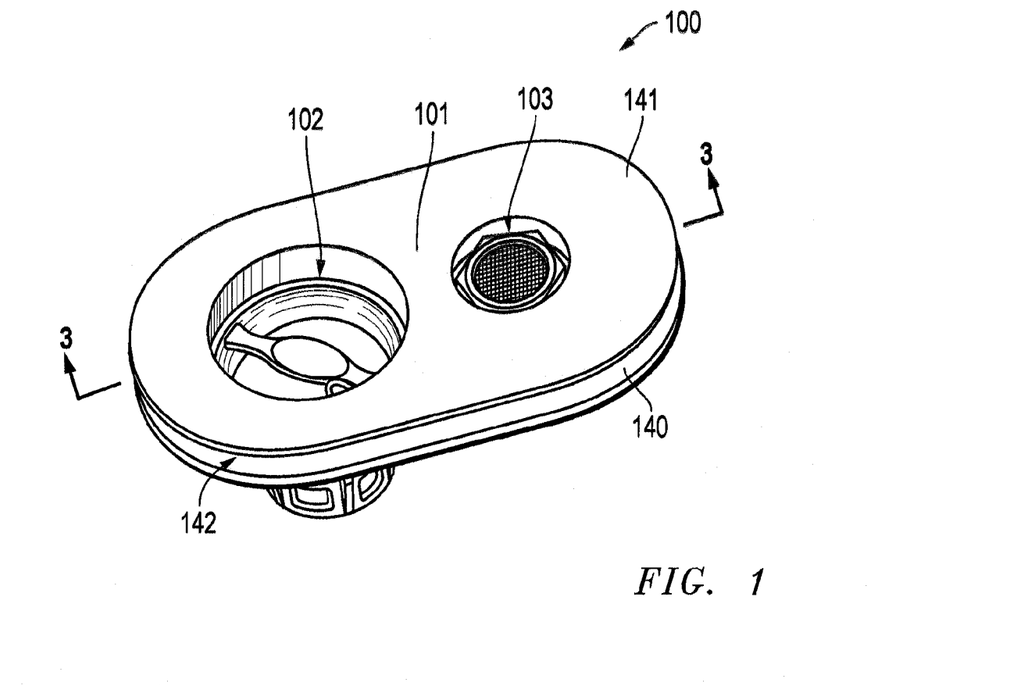
FIG. 1 is a view in perspective of a top portion of a valve structure embodying the principles of the invention.
Figure 2:
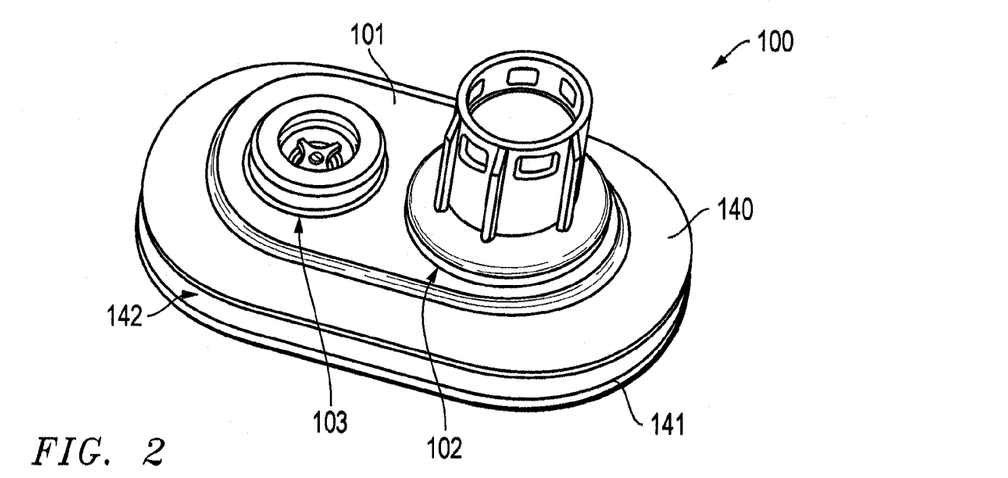
FIG. 2 is a view in perspective of a bottom portion of the valve structure shown in FIG. 1.
Figure 3:
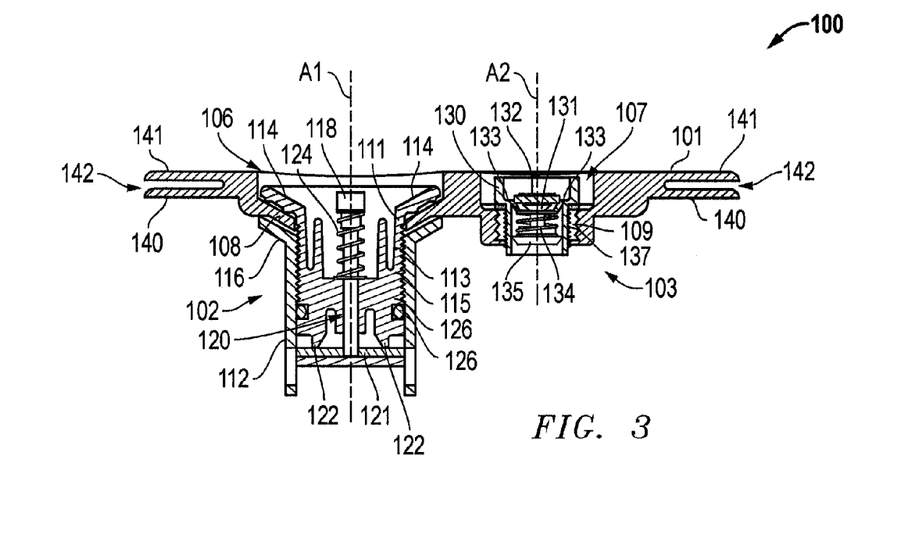
FIG. 3 is a view in section taken along line 3-3 in FIG. 1.

FIGS. 1 through 3 show a valve structure 100 for use in boats having an inflatable hull portion. Valve structure 100 includes a valve body 101, a first valve 102 traversing the valve body at a first position, and a second valve 103 traversing the valve body at a second position spaced apart from the first position.

As shown in FIG. 3, valve body 101 includes a first opening 106 for receiving first valve 102 and a second opening 107 for receiving second valve 103. First opening 106 includes a flange portion 108 to which first valve 102 is secured. Second opening 107 includes a threaded insert 109 in for receiving second valve 103.

The illustrated preferred first valve 102 is a fill valve (also called a topping valve) that allows air or other gas or fluid to be pumped into a bladder as will be described further below. As shown in FIG. 3, this preferred first valve 102 includes a top portion 111 and a bottom portion 112. Top portion 111 includes a threaded section 113 and top flange 114, while bottom portion 112 includes a corresponding threaded section 115 and bottom flange 116. Valve 102 further includes a plunger 118 slidably mounted through an opening 120 through the valve top portion 111. A lower portion of plunger 118 carries a sealing surface 121 that is adapted to form a seal against a valve seat surface 122 on the valve top portion. A spring 124 biases plunger 118 upwardly in the drawing to bias sealing surface 121 against valve seat surface 122 to form a seal. Valve top portion 111 threads together with valve bottom portion 112 to pull top flange 114 towards bottom flange 116 with flange portion 108 there between to secure first valve 102 to valve body 101 and form a seal against the valve body material. An o-ring 126 acting between valve top portion 111 and valve bottom portion 112 provides a seal between those two components. The illustrated first valve 102 operates by providing a seal in the position shown in FIG. 3 and by allowing a suitable gas to pass through openings in the valve top portion 111 when plunger 118 is displaced downwardly in the drawing to unseat sealing surface 121 from valve seat surface 122.

The illustrated preferred second valve 103 is a pressure relief valve that allows fluid to escape from the bladder once a certain fluid pressure is achieved in the bladder. As also shown in FIG. 3, this preferred second valve 103 includes a housing 130 with an opening there through in which is mounted a plunger 131. Plunger 131 carries a sealing element 132 which is adapted to seat against a valve seat 133 formed on housing 130. A spring 134 biases plunger 131 downwardly in FIG. 3 to pull sealing element 132 into contact with valve seat 133. Plunger 131 also includes an actuating surface 135 that causes sealing element 132 to unseat from valve seat 133 once a certain pressure is applied to the actuating surface to overcome the force of spring 134. Housing 130 includes a threaded section 137 that threads into the correspondingly threaded insert 109 in second valve body opening 107.

The specific valves shown in FIG. 3 for valves 102 and 103 are merely preferred forms and any other suitable form may be used in a valve structure according to the present invention. For example, both valves 102 and 103 may be molded with the material forming valve body 101, thus obviating the top and bottom structure of the illustrated valve 102 and the threading associated with valve 103, as well as the flange portion 108 and threaded insert 109. In one preferred form of the invention, a fill valve used in place of valve 102 includes a one-piece body with an outer thread by which the valve may be secured to valve body 101. This alternate preferred fill valve requires a threaded insert molded into the valve body for receiving the threaded fill valve, similar to threaded insert 109 used in the illustrated form of the invention for attaching valve 103 to valve body 101. In any case, the various valve components included in valves 102 and 103 may be made form any suitable material including preferably hard plastics or corrosion resistant metals. The valves may also include many other features not apparent from the present figures. For example, a fill valve such as valve 102 preferably includes a locking mechanism that allows the valve to be locked in an open position. Locking the valve in the open position facilitates deflating or draining a bladder in which the valve body is secured as will be described below.

As shown best in FIG. 3 but also somewhat in FIGS. 1 and 2, valve structure 100 further includes a first flange 140 and a second flange 141. First flange 140 extends from valve body 101 around the periphery of the valve body. First flange 140 also extends generally in a plane transverse to a longitudinal axis A1 of first valve 102 and a longitudinal axis A2 of second valve 103. Second flange 141 extends from valve body 101 around the periphery of the valve body, generally parallel to first flange 140 and spaced apart from the first flange to define a valve body positioning structure or groove 142 between the two flanges 140 and 141.

The illustrated preferred valve body 101 has a generally oval peripheral shape in a plane generally parallel to first flange 140. The illustrated first flange 140 and second flange 141 also each have a generally oval peripheral shape. Other preferred forms of the valve structure according to the present invention may include a circular peripheral shape or a polygonal peripheral shape rather than the illustrated oval shape. Also, the peripheral shape of the flanges 140 and 141 need not correspond to the peripheral shape of valve body 101, or to each other.

Valve body 101 and flanges 140 and 141 are preferably molded in one piece from a suitable rubber or plastic material such as a suitable Neoprene compound or fiber reinforced Neoprene. Also, as mentioned above, some preferred forms of the invention may include valves 102 and 103 integrally formed with the valve body 101.

Figure 4:
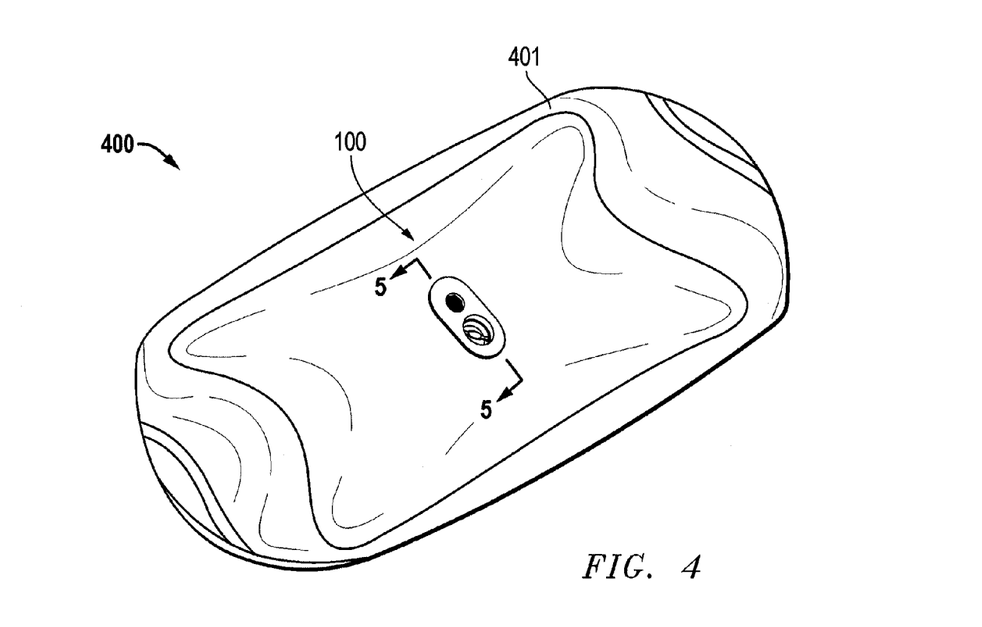
FIG. 4 is a view in perspective of a bladder embodying the principles of the invention.
Figure 5:
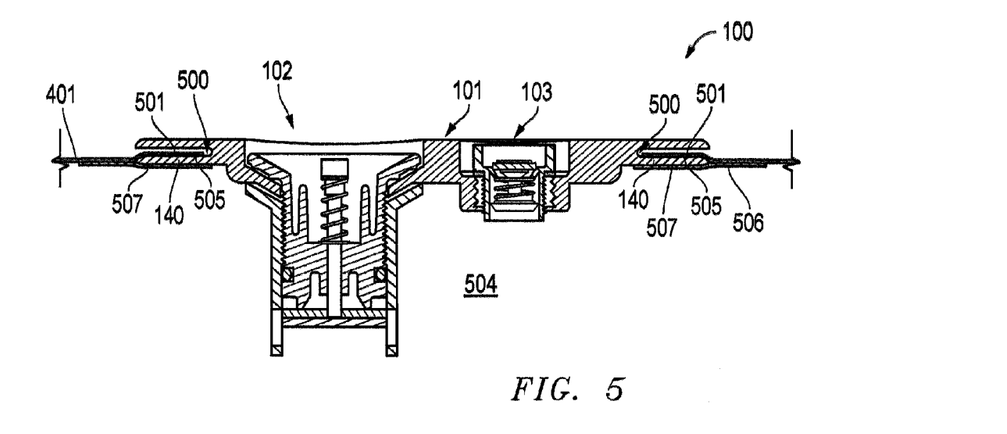
FIG. 5 is a view in section of the valve structure along with a portion of the bladder material taken along line 5-5 in FIG. 4.

FIG. 4 shows an inflatable bladder 400 according to the invention for use in boats having an inflatable hull portion. As shown in FIG. 4, bladder 400 includes a bladder portion or bladder material 401 and a valve structure such as valve structure 100 shown in FIGS. 1 through 3. The manner in which the illustrated valve structure 100 attaches to bladder material 401 is shown more particularly in FIG. 5. As best indicated in FIG. 5, bladder material 401 is made of a flexible sheet material and includes a valve receiving opening 500 (shown only in FIG. 5) at a valve location. In particular, valve receiving opening 500 is defined by bladder material edges 501 shown in FIG. 5. Valve structure 100 has a portion traversing valve receiving opening 500 as shown best in FIG. 5 and is sealed to the bladder material 401 around the periphery of the valve receiving opening so as to define a sealed bladder interior with the bladder material. This sealed bladder interior is indicated generally at 504 in FIG. 5. Bladder 400 according to the present invention also includes first valve 102 traversing valve body 101 at a first position within the area defined by valve receiving opening 500 and second valve 103 traversing valve body 101 at a second position within the area defined by the valve receiving opening 500.

As best shown in FIG. 5, bladder material edges 501 are sealed to an inner surface 505 of first flange 140. A backing material 506 is attached to the an outer surface 507 of first flange 140 and is also attached to the bladder material 401 around the bladder material edges 501. Any suitable adhesive or welding technique may be used to form the desired seal between bladder material 401 and valve structure 100.

Bladder material 401 preferably comprises a sheet of material such as a thin polyester film having opposite edged rolled up to a point at which the two edges of the sheet overlap and may be sealed together with adhesive or a suitable material welding technique to form a tube shape. Outwardly convex end sections of the bladder material or perhaps a different material may then be secured by adhesive or by a suitable welding technique to the ends of the tube formed sheet material to form generally an enclosure, open only at the valve receiving opening 500.

It will be appreciated that the sheet material 401 used to form bladder 400 is preferably quite flexible or bendable in directions transverse to the plane of the sheet material and preferably does not have sufficient rigidity to stand on its own in the cylindrical shape or convex shapes described in the preceding paragraph. Thus, the bladder 400 collapses to the shape shown in FIG. 4 when deflated. However, when the bladder is filled with fluid under a sufficient pressure through valve 102 in valve body 101, the bladder will naturally take on a cylindrical shape with outwardly convex ends.

Figure 6:
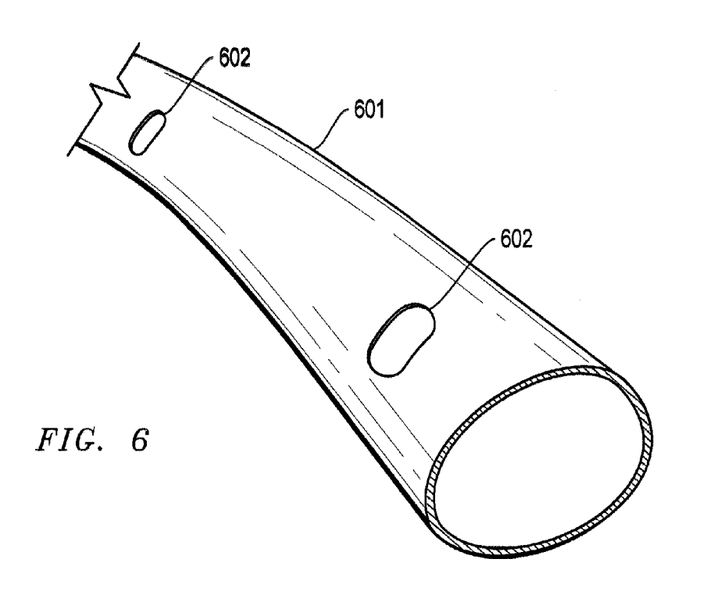
FIG. 6 is a view in perspective of a hull tube for an inflatable boat hull portion embodying the principles of the invention.
Figure 7:
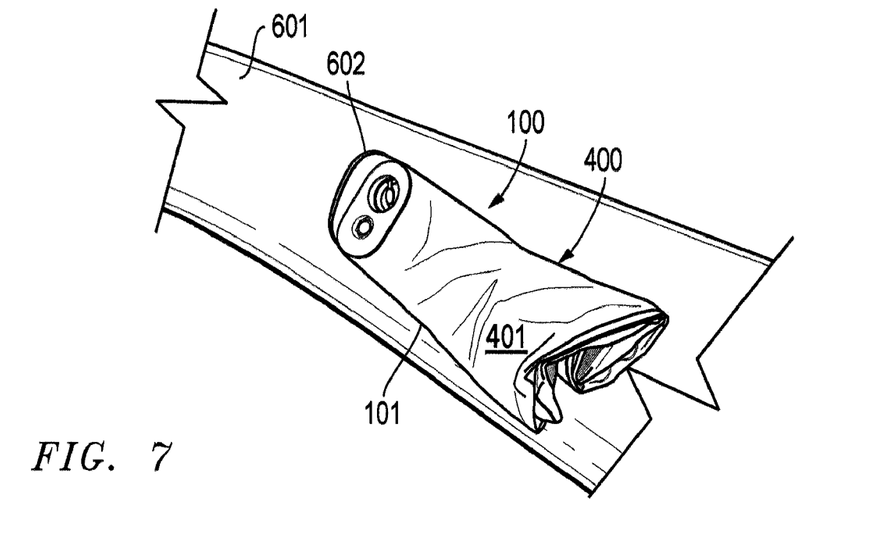
FIG. 7 is a view in perspective of a hull tube similar to FIG. 6, but showing a bladder embodying the principles of the invention partially inserted into the hull tube.
Figure 8:
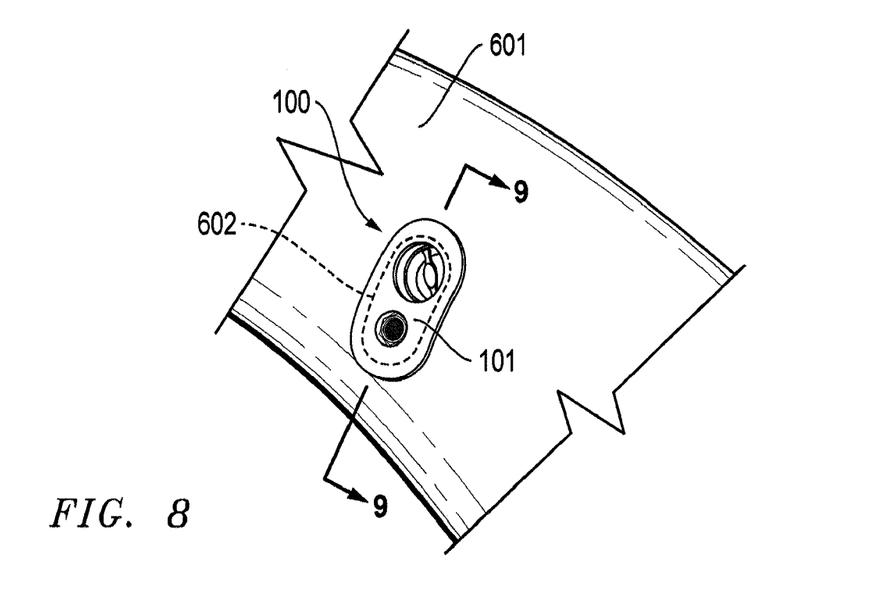
FIG. 8 is a view in perspective of the hull tube in FIGS. 6 and 7, with the valve structure and bladder combination in the inserted and operating position in the hull tube.

FIGS. 6 through 9 may be used to describe one preferred form of an inflatable hull portion for a boat according to the present invention. The inflatable hull portion includes a hull tube 601 shown particularly in FIGS. 6 and 7. At least a portion of hull tube 601 is made of a sheet material that is readily bendable, that is, bendable in directions transverse to the plane of the sheet material. Hull tube 601 includes an access opening 602 formed at an access location in the material making up the hull tube. By "readily bendable" it is meant that the hull tube material does not have sufficient rigidity to retain its shape without being held in position by some structure separate from the sheet material. The hull tube shapes shown particularly in FIGS. 6 and 7 show the shape as if it was being so supported. It will be appreciated that without support, the readily bendable hull tube material will collapse generally to the shape of the collapsed bladder shown in FIG. 4.

The sheet material used to form hull tube 601 may be pieced together in any suitable fashion. In one preferred form of the invention, rectangular sheets of readily bendable hull tube material are secured or seamed together by any suitable technique to form the desired tube shape. Suitable bendable hull tube material includes fabric reinforced plastic or rubber sheeting. For example suitable material includes a polyester fabric coated with polyurethane. It will be noted that the particular materials used for the hull tube sheeting may be selected purely for its strength and resistance to abrasion without regard to whether an airtight enclosure may be formed with the material. This is because unlike prior art RIB boats, the hull tube 601 is inflated to the desired shape using the airtight inner bladder such as bladder 400 shown in FIG. 4. In preferred forms of the invention, the bladder used inside hull tube 601 to inflate the hull tube to the desired shape is made at least partially of a bladder sheet material that is relatively more elastic or stretchable in the plane of the material than the hull tube bendable sheet material. With this relative elasticity between the hull tube material and bladder material, the bladder material may expand within the hull tube 601 as bladder 400 is inflated to press against the inner surface of the hull tube material and take up space within the hull tube until the hull tube takes on the desired inflated shape.

Figure 9:
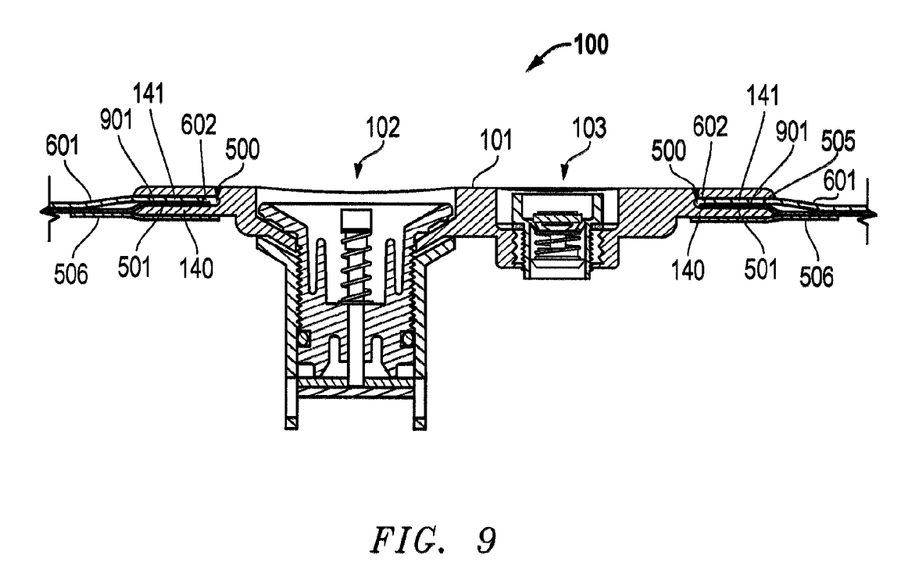
FIG. 9 is a view in section of the valve structure together with a portion of the bladder material and a portion of the hull tube material taken along line 9-9 in FIG. 8.

As indicated in FIG. 7, bladder 400 is rolled up lengthwise (rolled parallel to its longitudinal axis) to allow it to be inserted into the interior of hull tube 601 through hull tube access opening 602. Preferably, a suitable lubricant such as soapy water may be applied to the exterior surface of the bladder 400 to allow the bladder to be inserted through opening 602 more readily. Once the bladder 400 is completely inserted through opening 602, the end of the bladder nearest the opening is pulled back in interior of hull tube 601 in the direction opposite to the direction in which the bladder was inserted until the valve body 101 aligns with hull tube access opening 602. At this point, the valve body 101 may be pulled to the position shown in FIG. 8. In this position shown in FIG. 8 and in section in FIG. 9, valve receiving opening 500 (FIG. 9) is aligned at least partially with the hull tube access opening 602. In this position also at least a portion of the valve structure 100 traverses the hull tube access opening 602 with at least the fill valve 102 being accessible from outside the hull tube. Preferably both the fill valve 102 is accessible from outside the hull tube 601 and the pressure relief valve 103 is aligned with the hull tube access opening 602 so that pressure may be released as desired from bladder 400 through the hull tube access opening. As best shown in FIG. 9, in the properly inserted position, sections of the hull tube material 901 surrounding hull tube access opening 602 are captured in the positioning structure or groove 142 (labeled only in FIG. 3) defined between flanges 140 and 141 of the illustrated preferred valve structure.

It will be noted that in order to insert the bladder 400 into the interior of hull tube 601 through hull tube access opening 602 as described above with reference to FIGS. 8 and 9, the flanges 140 and 141 on valve 100 must be flexible. That is, the material from which flanges 140 and 141 are formed must be sufficiently flexible to allow the flanges to be flexed so as to fit through the relatively smaller hull tube access opening 602.

An inflatable hull according to the present invention may include only a singe hull tube access opening 602 and use only a single bladder 400. Some preferred forms of the invention, however, include an elongated single hull tube that includes multiple hull tube access openings along its length, each different hull tube access opening receiving a respective bladder 400. This multiple hull tube access opening and multiple bladder arrangement is illustrated in FIG.

6. In these multiple bladder arrangements, if one bladder should fail, the remaining bladders provide the desired function around the remainder of the periphery of the inflatable boat. Furthermore, some preferred forms of the invention, include a single continuous hull tube 601 formed to fit around the entire periphery of the inflatable boat or around a large portion of the periphery such as the bow together with the port and starboard sides. In any case, the multiple bladder embodiments of the invention preferably use the same valve and bladder structure described above and the same bladder insertion technique for each respective bladder.

Figure 10:
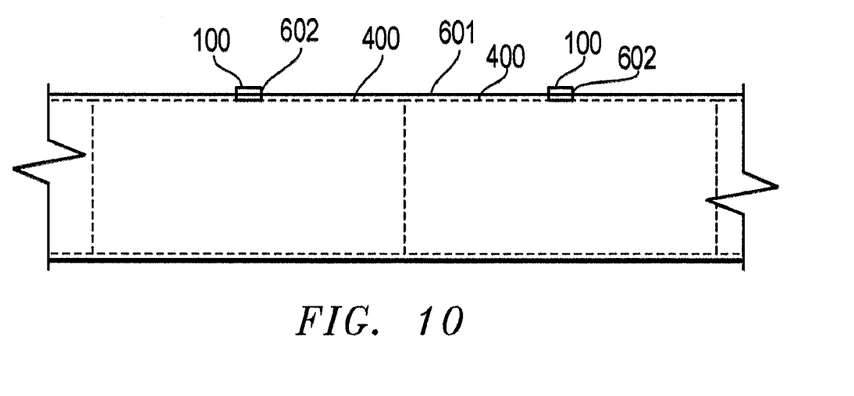
FIG. 10 is a diagrammatic view showing a hull portion within the scope of the present invention.
Figure 11:
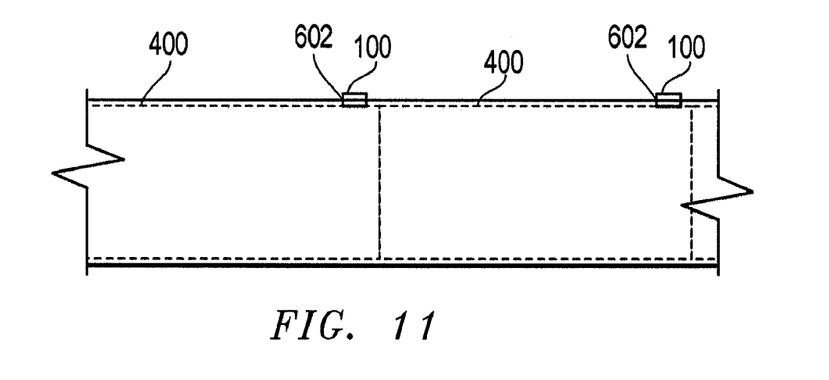
FIG. 11 is a diagrammatic view similar to FIG. 10 showing an alternate hull portion within the scope of the present invention.

The position of valve structure 100 along the length of bladder 400 may be varied greatly within the scope of the invention. Although FIG. 4 shows valve structure 100 positioned generally midway along the length of bladder 400, the valve structure may in fact be positioned anywhere along the length of the bladder, in the middle position shown in FIG. 4, or near either end. Also, there may be some forms of the invention in which valve structure 100 may be located on the piece of bladder material making up an end of the bladder. Of course, the position of valve structure 100 on bladder 400 generally dictates the location of the hull tube access openings 602. FIG. 10 provides a diagrammatic representation showing the relationship between the respective valve structure 100, bladder 400, and hull tube access opening 602 in one preferred form of the invention where the valve structures are positioned in a mid-section of each bladder. FIG. 11 provides a diagrammatic representation showing the relationship between the respective valve structure 100, bladder 400, and hull tube access opening 602 in an alternate form of the invention in which the valve structure 100 is located near an end of the respective bladder. It will be noted that with the valve position shown in FIG. 11, the entire valve 100 need not be inserted through hull tube access opening 602 to reach the properly installed position. Rather, only the lower or first flange 140 (FIGS. 3, 5, and 9) together with the lower portion of valve body 101 must be inserted through hull tube access opening 602. Thus, with the form of the valve 100 shown in FIGS. 3, 5, and 9, only the first or lower flange 140 must be sufficiently flexible to bend so that it may pass through hull tube access opening 602 and reach the installed, operating position shown in FIGS. 8 and 9. Regardless of the position of the valve structure 100 in a bladder 400 according to the present invention, the valve structure performs the function of locating or positioning the bladder with respect to the hull tube.

Figure 12:
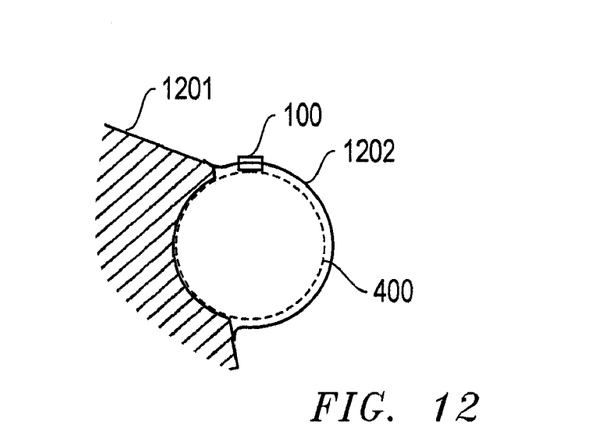
FIG. 12 is a partial transverse section view showing an alternate structure for receiving a bladder according to the present invention.

It should also be noted that since the hull tube 601 in the present invention is not required to be airtight or watertight, the hull tube need not form a complete cylindrical tube. Rather, a structure for receiving a bladder according to the invention may be formed from a rigid structure along one side with a readily bendable material as described above along the opposite side as shown in the section view of FIG. 12 (with the section taken along a line generally perpendicular to the longitudinal axis of the bladder. In this example, a rigid material 1201 forms a portion of a hull tube or bladder receiving area and a readily bendable material 1202 forms the remainder of the circumference of the hull tube/bladder receiving area. A bladder 400 as described above resides in the area defined by rigid material 1201 and readily bendable material 1202 and, when inflated as shown in the figure, causes the readily bendable material to maintain the desired shape. It will be appreciated that the space between the material of bladder 400 and the material 1202 in FIG. 12 is exaggerated to clearly indicate that the materials are separate. In practice, the material of bladder 400 would press up against the inner surface of material 1202 when the bladder is fully inflated.

Some forms of the invention combine the fill and pressure relief functions of the illustrated valves 102 and 103 into a common valve structure. When using a hybrid fill valve/pressure relief valve, it will be appreciated that the valve body would require only a single opening and associated structure (such as a threaded insert) for receiving the valve. In forms of the invention utilizing a single valve structure secured in the valve body as opposed to the multiple valve arrangement shown particularly in FIGS. 1 through 3, the valve body still performs the function of providing a surface to which the bladder material may be sealed and also performs the function of positioning the bladder with respect to the hull tube in which the bladder is installed.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Any use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims. For example, although the illustrated hull tube 601 includes hull tube access openings 602 oriented with their long axis extending transverse to the length of the hull tube, the hull tube access openings may be in any other suitable orientation. In particular, a hull tube access opening 602 may be oriented with its respective long axis aligned with the longitudinal axis of the hull tube.

The invention claimed is:

1. An inflatable bladder for use in a boat having an inflatable hull portion, the inflatable bladder including:
   (a) a bladder made of a flexible material, the bladder including a valve receiving opening at a valve location in the material making up the bladder;
   (b) a valve body having a portion traversing the valve receiving opening;
   (c) a first valve positioned in the valve body at a first position within the area defined by the valve receiving opening in the bladder material;
   (d) a first flange extending from the valve body around the periphery of the valve body, the first flange extending generally in a plane transverse to a longitudinal axis of the first valve, and the bladder material around the entire periphery of the valve receiving opening being sealed to the first flange; and
   (e) a second flange extending from the valve body around the periphery of the valve body at a location outside of the volume encompassed by the bladder, the second flange extending generally parallel to the first flange and being spaced apart from the first flange and the bladder material sealed to the first flange.

2. The inflatable bladder of claim 1 wherein the first valve is a fill valve.

3. The inflatable bladder of claim 1 further including a pressure relief valve positioned in the valve body at a second position within the area defined by the valve receiving opening in the bladder material.

4. The inflatable bladder of claim 1 wherein the valve body has a generally oval peripheral shape in a plane generally parallel to the first flange, and wherein the first flange and second flange also have a generally oval peripheral shape.

5. The inflatable bladder of claim 4 wherein the bladder is elongated and the longitudinal axis of the oval peripheral shape extends transverse to a longitudinal axis of the bladder.

6. The inflatable bladder of claim 1 wherein the bladder material around the entire periphery of the valve receiving opening is sealed to the first flange on an inner side of the first flange facing the second flange, and further including a backing material adhered to an outer side of the first flange facing away from the second flange.

7. An inflatable bladder for use in a boat having an inflatable hull portion, the inflatable bladder including:
  (a) a bladder made of a flexible material, the bladder including a valve receiving opening at a valve location in the material making up the bladder;
  (b) a valve body having a portion traversing the valve receiving opening;
  (c) a first valve positioned in the valve body at a first position within the area defined by the valve receiving opening in the bladder material;
  (d) a first flange extending from the valve body around the periphery of the valve body, the first flange extending generally in a plane transverse to a longitudinal axis of the first valve, and the bladder material around the entire periphery of the valve receiving opening being sealed to the first flange; and
  (e) a second flange extending from the valve body around the periphery of the valve body at a location outside of the volume encompassed by the bladder, the second flange extending generally parallel to the first flange and being spaced apart from the first flange, and
  (f) wherein the first flange and second flange are each attached to the valve body in a respective fixed position relative to each other.

8. The inflatable bladder of claim 7 wherein the first valve is a fill valve.

9. The inflatable bladder of claim 7 further including a pressure relief valve positioned in the valve body at a second position within the area defined by the valve receiving opening in the bladder material.

10. The inflatable bladder of claim 7 wherein the valve body has a generally oval peripheral shape in a plane generally parallel to the first flange, and wherein the first flange and second flange also have a generally oval peripheral shape.

11. The inflatable bladder of claim 10 wherein the bladder is elongated and the longitudinal axis of the oval peripheral shape extends transverse to a longitudinal axis of the bladder.

12. The inflatable bladder of claim 7 wherein the bladder material around the entire periphery of the valve receiving opening is sealed to the first flange on an inner side of the first flange facing the second flange and further including a backing material adhered to an outer side of the first flange facing away from the second flange.

13. An inflatable bladder for use in a boat having an inflatable hull portion, the inflatable bladder including:
  (a) a bladder made of a flexible material, the bladder including a valve receiving opening at a valve location in the material making up the bladder;
  (b) a valve body having a portion traversing the valve receiving opening;
  (c) a first valve positioned in the valve body at a first position within the area defined by the valve receiving opening in the bladder material;
  (d) a first flange extending from the valve body around the periphery of the valve body, the first flange extending generally in a plane transverse to a longitudinal axis of the first valve, and the bladder material around the entire periphery of the valve receiving opening being sealed to the first flange; and
  (e) a second flange extending from the valve body around the periphery of the valve body at a location outside of the volume encompassed by the bladder, the second flange extending generally parallel to the first flange and being spaced apart from the first flange, and
  (f) wherein the first flange and second flange are each integrally formed with the valve body.

14. The inflatable bladder of claim 13 wherein the first valve is a fill valve.

15. The inflatable bladder of claim 13 further including a pressure relief valve positioned in the valve body at a second position within the area defined by the valve receiving opening in the bladder material.

16. The inflatable bladder of claim 13 wherein the valve body has a generally oval peripheral shape in a plane generally parallel to the first flange, and wherein the first flange and second flange also have a generally oval peripheral shape.

17. The inflatable bladder of claim 16 wherein the bladder is elongated and the longitudinal axis of the oval peripheral shape extends transverse to a longitudinal axis of the bladder.

18. The inflatable bladder of claim 13 wherein the bladder material around the entire periphery of the valve receiving opening is sealed to the first flange on an inner side of the first flange facing the second flange and further including a backing material adhered to an outer side of the first flange facing away from the second flange.

* * * * *